Oct. 28, 1924.

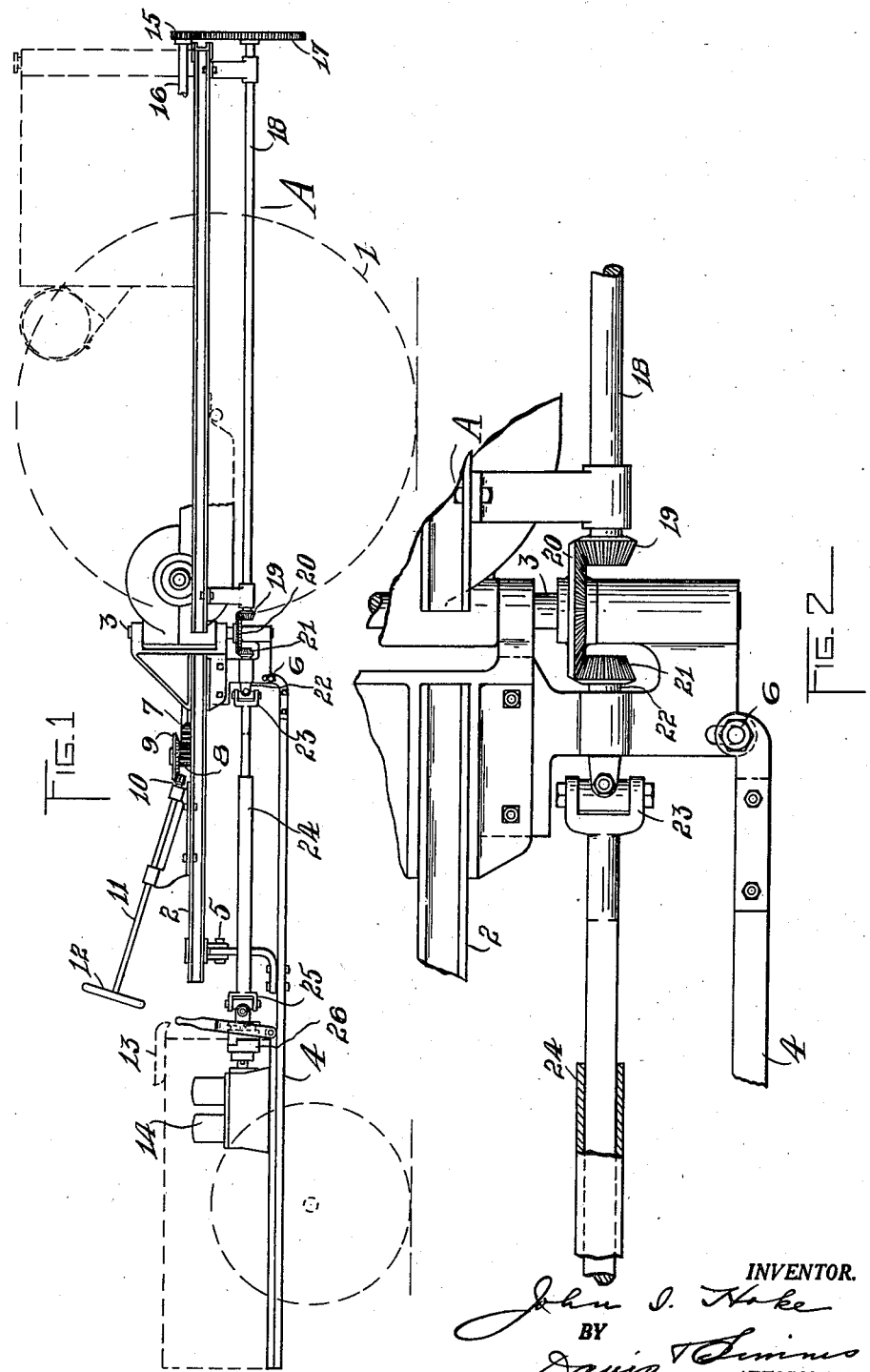

J. I. HOKE

TRACTOR

Filed Oct. 4, 1919    3 Sheets-Sheet 2

1,513,173

INVENTOR.
John I. Hoke
BY
Davis V. Timms
his ATTORNEYS.

Oct. 28, 1924.
J. I. HOKE
TRACTOR
Filed Oct. 4, 1919
1,513,173
3 Sheets-Sheet 3
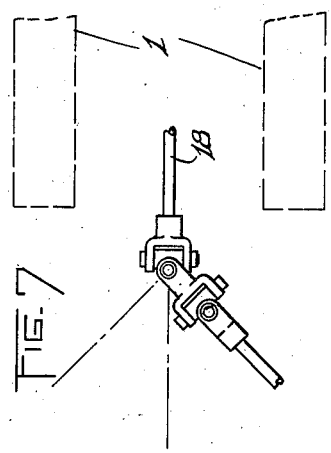
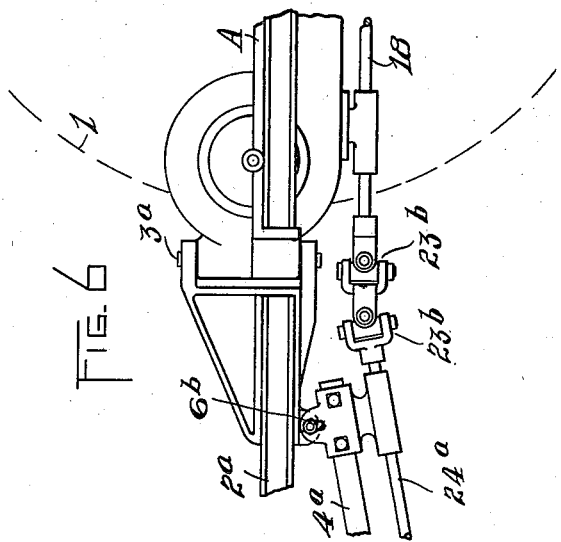
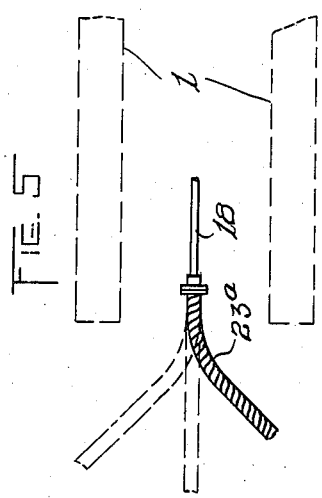
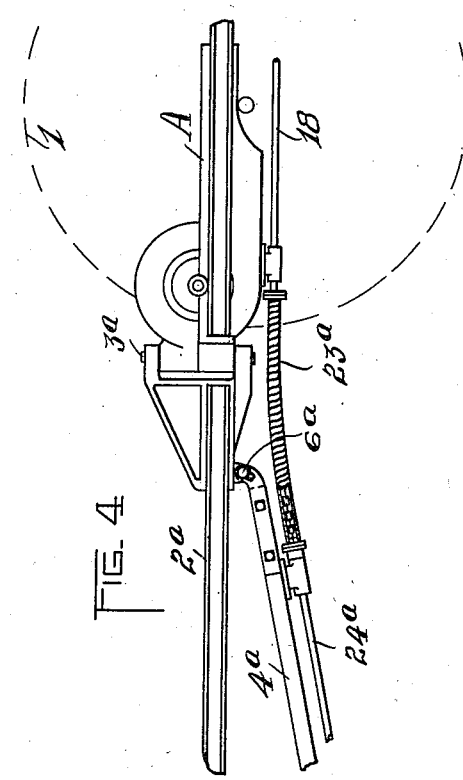
INVENTOR.
John I. Hoke
BY
Davis & Simms
his ATTORNEYS.

Patented Oct. 28, 1924.

1,513,173

UNITED STATES PATENT OFFICE.

JOHN I. HOKE, OF MEDINA, NEW YORK, ASSIGNOR TO MOLINE PLOW COMPANY, INC., OF MOLINE, ILLINOIS, A CORPORATION OF VIRGINIA.

TRACTOR.

Application filed October 4, 1919. Serial No. 328,552.

*To all whom it may concern:*

Be it known that I, JOHN I. HOKE, a citizen of the United States, and resident of Medina, in the county of Orleans and State of New York, have invented certain new and useful Improvements in Tractors, of which the following is a specification.

The invention relates to tractors.

It relates particularly to tractors of the type which have a forward motor driven part provided with means for connecting it to a rear trailing part or drawn device. It is often desirable to drive mechanism on the drawn device with power from the tractor, but many difficulties are encountered in providing a practical construction by means of which the power can be transmitted without destroying the flexibility of the machine for operation over rough ground. Also, provision must be made to permit the power transmitting means to be connected in various positions as it must be when the tractor is used with various implements.

The general object of the invention is to provide an improved combination of this type for transmitting power from the forward motor driven unit to the rear trailing unit.

Other objects and advantages will hereinafter appear.

An embodiment of the invention is shown in the drawings, in which,—

Fig. 1 shows in side elevation a tractor constructed in accordance with this invention, parts of the tractor being shown in dotted lines;

Fig. 2 is an enlarged side elevation with parts in section showing the connection between the forward motor driven part and the rear trailing part;

Fig. 4 is a detail view of another embodiment in which the driving connection between the motor driven part and the mechanism to be driven is shown as embodying a flexible shaft;

Fig. 5 is a plan view of the embodiment shown in Fig. 4 showing the manner in which the flexible shaft bends when the trailing part shifts to different positions;

Fig. 6 is a detail view of still another embodiment of the invention in which the driving connection has another form of flexible connection; and Fig. 7 is a detail view of the embodiment shown in Fig. 6.

Figure 3:
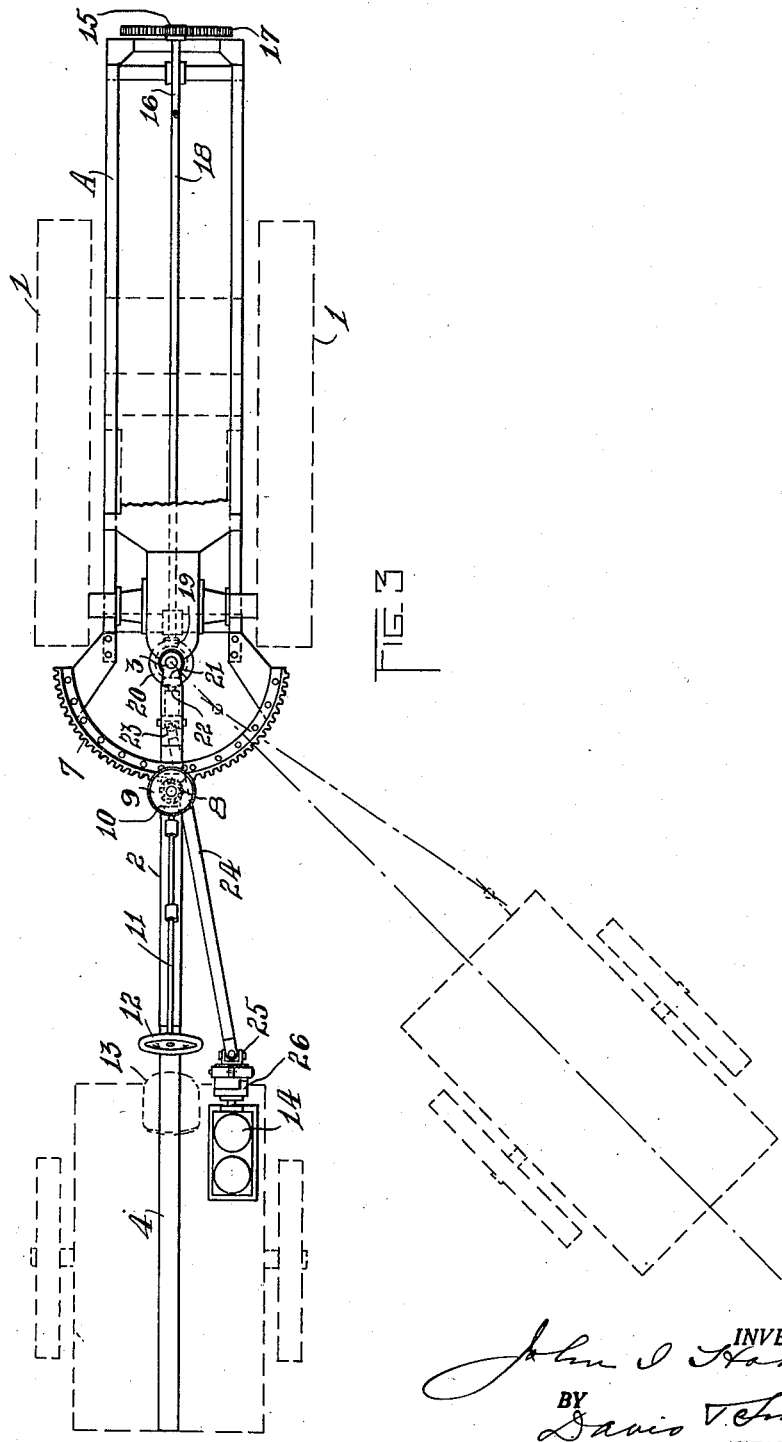
Fig. 3 is a plan view of the tractor with parts thereof shown in dotted lines, the trailing part being shown shifted relatively to the motor driven part as well as in line with the motor driven part.

Referring more particularly to the drawings, A indicates the forward motor driven part, it being provided with the motor (not shown) adapted to be connected at will with the wheels 1, of which only two are provided in this instance. The rear trailing part of the tractor embodies preferably a coupling frame 2 pivotally connected to the forward motor driven part preferably through a vertically arranged shaft 3 located to the rear of the axis of the drive wheels 1. The rear trailing part may also embody a wheel frame 4 flexibly connected to the frame 2 preferably through a longitudinally extending pivot bolt 5 and a loose connection 6 in the form of a bolt extending through an enlarged opening in the frame 2.

The forward motor driven part A may be steered in any desired manner. As in this embodiment, the motor driven part has only a pair of wheels, it is possible to steer the tractor by controlling the relative positions of the forward motor driven part and the rear trailing part. This is preferably accomplished by providing the forward motor driven part with a gear segment 7 with which a pinion 8 mounted on the frame 2 meshes. Connected to the pinion 8 is a bevel gear 9 with which a bevel pinion 10 on the steering post 11 meshes. The steering post is mounted on the frame 2 and extends rearwardly so that the steering wheel 12 thereon will be operable from a seat 13 on the rear trailing frame 4.

It is often desirable, when using tractors of this type, to connect to them a device to be drawn having mechanism which must be driven by power. In this instance the rear trailing part is provided with an air pump which may be used for any purpose such as the storing of air in the tank for use in spraying. These mechanisms have heretofore been driven either through the ground wheels of the rear trailing part, or through a separate motor mounted on the rear trailing part, therefore requiring two motors on the tractor, one for propelling the vehicle and the other for driving the mechanism on the rear trailing part. When the tractor is stationary and the rear trailing part has its mechanism driven through the ground wheels, the mechanism must necessarily be idle during the idleness of the tractor. In some machines, such as sprayers and threshing machines this is undesirable and it is a purpose of this invention to overcome this objection, while at the same time utilizing but one motor on the tractor. Of course, the invention may also be embodied in a construction where the mechanism is driven during the movement of the tractor as where the trailing part is in the form of a mower a binder, a corn harvester or similar machine, connected to a motor driven part designed for heavy work such as the pulling of a trailing part in the form of a plow, surplus power being present when the plow trailer is removed and a mower trailer substituted.

The foregoing results are obtained in this instance by providing a driving connection between the motor on the motor driven part and the mechanism on the trailing part. Preferably this driving connection has provision which permits the swinging of the trailing part with reference to the motor driven part and preferably also provision is made which will permit the use of this driving connection at will so that the mechanism to be driven may be operated at any suitable time.

In the embodiment shown in Figs. 1 to 3 the driving connection between the motor on the driven part and the mechanism on the trailing part embodies a gear 15 on a shaft 16 connected with the motor, said gear meshing with a gear 17 on a shaft 18 extending longitudinally of the driven part and provided at its rear end with a bevel pinion 19 which meshes with a bevel gear 20 on the shaft 3. A bevel pinion 21 on a stub shaft 22 carried by the trailing part also meshes with the gear 20 and connects with the mechanism 14 to be driven preferably through a knuckle joint 23, an extensible shaft 24, a knuckle joint 25 and a clutch 26. This driving connection through the bevel gears 20 and 21 permits the trailing part to swing about the shaft 3 as an axis without interfering with such driving connection. The knuckle joints 23 and 25 as well as the extensible shaft 24 permit the wheel frame on the trailing part to swing relatively to the frame 2 so that the rear trailing frame 4 may swing about the axis 5 to accommodate such frame to uneven surfaces over which the tractor is traveling.

In the embodiment shown in Figs. 4 and 5 the forward driven part A connects with the frame 2$^a$ of the trailing part through a pivot bolt 3$^a$ and the wheeled frame 4$^a$ connects with the frame 2$^a$ by a loosely mounted bolt 6$^a$ as well as through a connection similar to that shown in Fig. 1. The shaft 18 on the motor driven part connects with the shaft 24$^a$ on the trailing part by a flexible connection 23$^a$ in the form of a flexible shaft permitting the trailing part to receive power from the motor driven part and at the same time to swing relatively to the motor driven part.

In the embodiment shown in Figs. 6 and 7 the motor driven part A connects with the wheeled trailing part 2$^a$ by a shaft 3$^a$ in the same manner as the embodiment shown in Figs. 4 and 5. The shaft 18 on the motor driven part connects with the shaft 24$^a$ on the wheel frame 4$^a$ of the trailing part by two knuckle joints 23$^b$ so as to permit the frame 4$^a$ to swing about the shaft 3$^a$ as an axis as well as about the loose connections 6$^b$ between the frame 4$^a$ and the frame 2$^a$.

From the foregoing it will be seen that there has been provided a tractor having a forward motor driven part and a rear trailing part provided with a mechanism to be driven, connection being provided between the motor on the motor driven part and the mechanism on the rear trailing part whereby said mechanism may be operated at will from the motor on the motor driven part, Provision has also been made whereby the driving connection is maintained between the motor on the motor driven part and the mechanism on the trailing part notwithstanding the fact that a flexible connection is provided between the trailing part and the motor driven part. Provision is also made whereby the mechanism on the trailing part may be rendered inoperative at will notwithstanding the propelling of the motor driven part through the motor thereon.

What I claim as my invention and desire to secure by Letters Patent is:

The combination with a front wheel drive tractor of the unstable type having a power plant, two forward drive wheels, and a rearwardly extending coupling frame for connecting the tractor to a drawn device to combine the two into a stabilized unit, said coupling frame being pivoted to the tractor to the rear of the axis of the drive wheels so as to swing about a substantially vertical axis for steering purposes, of a drawn device carrying mechanism to be operated by power, power transmitting means extending from the tractor to the coupling frame and to the drawn device, said means being flexible in substantial alignment with the axis of the pivot of the coupling frame to the tractor so that the power will be transmitted in all positions assumed by the coupling frame when the tractor is steered, said means also being flexible relative to the coupling frame, and means carried by the coupling frame for supporting the power transmitting means so that it may be moved horizontally or vertically relative to the coupling frame to readily connect it to various mechanisms on the drawn devices.

JOHN I. HOKE.